United States Patent
Kim

(10) Patent No.: US 11,524,408 B2
(45) Date of Patent: Dec. 13, 2022

(54) METHOD AND APPARATUS FOR PROVIDING FOOD TO USER

(71) Applicant: LG ELECTRONICS INC., Seoul (KR)

(72) Inventor: Byeongrok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 352 days.

(21) Appl. No.: 16/561,466

(22) Filed: Sep. 5, 2019

(65) Prior Publication Data

US 2019/0389067 A1    Dec. 26, 2019

(30) Foreign Application Priority Data

Aug. 5, 2019  (KR) .................. 10-2019-0094962

(51) Int. Cl.
*B25J 9/16*  (2006.01)
*B25J 19/02*  (2006.01)
*B25J 11/00*  (2006.01)

(52) U.S. Cl.
CPC .......... *B25J 9/1694* (2013.01); *B25J 9/1612* (2013.01); *B25J 9/1633* (2013.01); *B25J 9/1679* (2013.01); *B25J 11/008* (2013.01); *B25J 19/02* (2013.01)

(58) Field of Classification Search
CPC ... B25J 9/16; B25J 9/1694; B25J 9/163; B25J 9/1628; B25J 9/1656; B25J 9/1633; B25J 9/1664; B25J 9/1679; B25J 9/1612; B25J 19/02; B25J 11/00; B25J 11/008; B25J 11/009; B25J 11/0045; B25J 13/08; B25J 13/087; B25J 13/088; G05B 2219/39523

USPC ......................................................... 700/258
See application file for complete search history.

(56) References Cited

U.S. PATENT DOCUMENTS

| | | | | |
|---|---|---|---|---|
| 9,066,615 B2* | 6/2015 | Song | ..................... | B25J 11/009 |
| 9,566,714 B2* | 2/2017 | Dekar | ..................... | A47G 23/10 |
| 10,004,625 B2* | 6/2018 | Fogelberg | ............. | B25J 9/1679 |
| 10,293,488 B2* | 5/2019 | Hall | ..................... | B25J 11/008 |
| 2015/0260566 A1* | 9/2015 | Conder | ............. | G01G 19/4144 |
| | | | | 177/25.13 |

FOREIGN PATENT DOCUMENTS

KR   10-2011-0112690   10/2011

\* cited by examiner

*Primary Examiner* — Khoi H Tran
*Assistant Examiner* — Sarah A Tran
(74) *Attorney, Agent, or Firm* — KED & Associates, LLP

(57) ABSTRACT

Provided is a method of providing food to a user, the method including determining to provide first food among the food to the user; moving a first gripper to a container that contains the first food, determining whether the first gripper reciprocates in the container, calculating a weight difference value indicating an amount of change in a total weight of the food before and after the reciprocating in response to a determination that the first gripper reciprocates in the container, and determining that the first food is provided to the user based on the weight difference value. In addition, an apparatus for providing food to a user to perform the food providing method is provided. Also, a non-transitory computer-readable storage medium storing programs to perform the food providing method is provided.

16 Claims, 13 Drawing Sheets

METHOD AND APPARATUS FOR PROVIDING FOOD TO USER

CROSS-REFERENCE TO RELATED APPLICATION

This application is based on and claims priority under 35 U.S.C. § 119(a) to Korean Patent Application No. 10-2019-0094962, which was filed on Aug. 5, 2019, in the Korean Intellectual Property Office, the disclosure of which is incorporated herein in its entirety by reference.

BACKGROUND

1. Field

Example embodiments of the present disclosure relate to a method and apparatus for efficiently providing food to a user and, more particularly, to a method and apparatus for assisting a user with an uncomfortable limb in having a meal by determining whether food is appropriately provided to the user when providing the food to the user.

2. Description of the Related Art

In order to eat efficiently, a user needs to move his or her hands freely. However, a user with uncomfortable limbs may use an assistance device that moves instead of hands for having a meal.

In related arts, a technology for automatically putting food into a user has been used as a device for assisting the user in having a meal. For example, Korean Patent No. 1,237,245 discloses a technology that displays a plate on a touch pad-type liquid crystal display to put food into a mouth of a user by automatically manipulating a picking arm when the user touches a position of the plate containing the food.

Accordingly, the user may automatically take the food using assistance devices without need to directly move a hand to pick the food.

SUMMARY

In related arts, there is provided a feeding arm that automatically and flexibly moves so that a user does not need to directly move a hand to pick up foods when having a meal. However, it is impossible to check whether the automatically provided food is appropriately provided to the user without being spilled, and there is inconvenience in that the user or a helper around the user needs to confirm that the food is not provided appropriately.

Aspects of the present disclosure are to determine, in a situation that food is automatically moved even if a user does not move a hand, whether the food is appropriately provided to the user to determine whether the user is normally having a meal and provide an appropriate meal course to the user based on a determination result.

To solve the above-described technical issues, according to an example embodiment, there is provided a method of providing food to a user, the method including determining to provide first food among the food to the user; moving a first gripper to a container that contains the first food, determining whether the first gripper reciprocates in the container, calculating a weight difference value indicating an amount of change in a total weight of the food before and after the reciprocating in response to a determination that the first gripper reciprocates in the container, and determining that the first food is provided to the user based on the weight difference value.

To solve the above-described technical issues, according to an example embodiment, there is provided an apparatus for providing food to a user, the apparatus including at least one container that contains the food, a first gripper configured to carry the food, and a controller configured to determine to provide first food among the food to the user, control the first gripper to move to a container that contains the first food, determine whether the first gripper reciprocates in the container, calculate a weight difference value indicating an amount of change in a total weight of the food before and after the reciprocating in response to a determination that the first gripper reciprocates in the container, and determine that the first food is provided to the user based on the weight difference value.

To solve the above-described technical issues, according to an example embodiment, there is provided a non-transitory computer-readable storage medium storing programs to perform a food providing method.

According to example embodiments, it is possible to enable a user with an uncomfortable hand to normally eat food.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
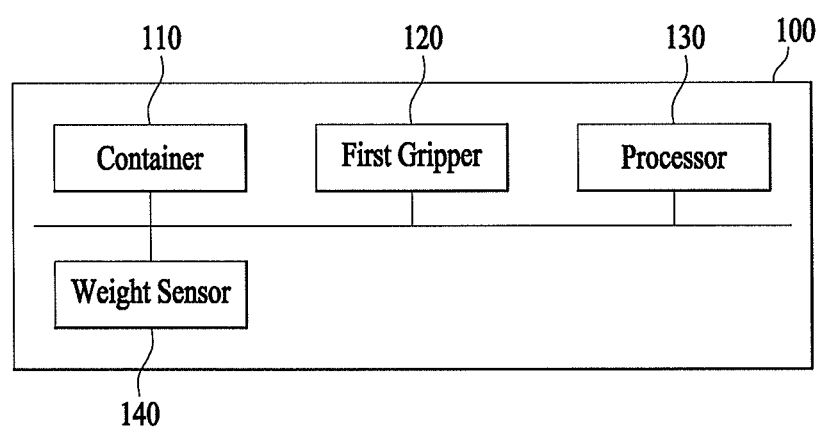
FIG. 1 is a block diagram illustrating a food providing apparatus according to an example embodiment.

Hereinafter, example embodiments of the present disclosure will be described in detail with reference to the drawings so that those skilled in the art can easily carry out the present disclosure. The present disclosure may be embodied in many different forms and is not limited to the embodiments described herein.

With respect to constituent elements used in the following description, suffixes "module" and "unit" are given or mingled with each other only in consideration of ease in the preparation of the specification, and do not have or serve as different meanings.

In order to clearly describe the present disclosure, elements having no connection with the description are omitted, and the same or extremely similar elements are designated by the same reference numerals throughout the specification. In addition, some embodiments of the present disclosure will be described in detail with reference to exemplary drawings. When adding reference numerals to constituent elements of the respective drawings, it should be noted that the same or similar elements are denoted by the same reference numerals even though they are depicted in different drawings. In addition, in the following description of the present disclosure, a detailed description of known functions and configurations incorporated herein will be omitted when it may make the subject matter of the present disclosure rather unclear.

In addition, it will be understood that the terms first, second, A, B, (a), and (b), for example, may be used herein to describe various elements according to the embodiments of the present disclosure. These terms are only used to distinguish one element from another element and, thus, are not intended to limit the essence, order, sequence, or number of elements. It will be understood that, when any element is referred to as being "connected to" "coupled to", or "joined to" another element, it may be directly on, connected to or coupled to the other element or intervening elements may be present.

It will be further understood that the terms "comprises" "comprising" "includes" and/or "including" when used in this specification, specify the presence of stated features, integers, steps, operations, elements, and/or components, but do not preclude the presence or addition of one or more other features, integers, steps, operations, elements, and/or components.

In addition, for convenience of description, the present disclosure may be embodied by subdividing constituent elements, but these constituent elements may be embodied in a single device or module, or one constituent element may be divided into multiple devices or modules.

Prior to describing example embodiments of the present disclosure, key terms are described below.

The term "container" may be defined as a predetermined space included in a food providing apparatus to contain food to be provided to a user. According to an example embodiment, a top of the container may be open. Also, the container may have any shape downwardly recessed from a top plate of the food providing apparatus.

A "gripper" may have a structure that is used to pick up various foods. The gripper may include various structures (e.g., a driver, a joint, a link, etc.) to naturally move in various directions such as axial rotation and linker movement. According to an example embodiment, a shape of a lower end structure of the gripper for delivering food to a mouth of a user may be implemented in various forms having a size and a structure suitable for an oral structure of the user, such as a spoon, a fork, and the like. The gripper may be embodied as various aspects to grip and move food within a range to be easily adopted by those skilled in the art.

The term "artificial Intelligence (AI)" refers to the field of studying artificial intelligence or a methodology capable of making the artificial intelligence, and the term "machine learning" refers to the field of studying methodologies that define and solve various problems handled in the field of artificial intelligence. The machine learning is also defined as an algorithm that enhances performance for a certain operation through a steady experience with respect to the operation.

The term "artificial neural network (ANN)" may include an input layer and an output layer, and may selectively include one or more hidden layers. Each layer may include one or more neurons, and the artificial neural network may include a synapse that interconnects neurons. In the artificial neural network, each neuron may output the value of an activation function concerning signals input through the synapse, weights, and deflection thereof.

The artificial intelligence may refer to a general model for use in the machine learning, which is composed of artificial neurons (nodes) forming a network by synaptic connection and has problem solving ability. The artificial neural network may be defined by a connection pattern between neurons of different layers, a learning process of updating model parameters, and an activation function of generating an output value.

The model parameters refer to parameters determined by learning, and include weights for synaptic connection and deflection of neurons, for example. Then, hyper-parameters refer to parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks is also called deep learning, and the deep learning is a part of the machine learning. In the following description, the machine learning is used as a meaning including the deep learning.

The term "autonomous driving (or self-driving)" refers to a technology in which a vehicle drives autonomously, and the term "autonomous vehicle" refers to a vehicle that travels without a user's operation or with a user's minimum operation.

For example, autonomous driving may include all of the technology of maintaining the lane in which a vehicle is driving, the technology of automatically adjusting a vehicle speed such as adaptive cruise control, the technology of causing a vehicle to automatically drive along a given route, and the technology of automatically setting a route, along which a vehicle drives, when a destination is set.

The vehicle may include all of a vehicle having only an internal combustion engine, a hybrid vehicle having both an internal combustion engine and an electric motor, and an electric vehicle having only an electric motor, and may include not only an automobile but also a train and a motorcycle, for example.

At this time, the autonomous vehicle may be seen as a robot having an autonomous driving function.

The term "extended reality" (XR) is a generic term for virtual reality (VR), augmented reality (AR), and mixed reality (MR). The VR technology provides only a CG image of a real-world object or background, for example, the AR technology provides a virtual CG image over an actual object image, and the MR technology is a computer graphic technology of providing an image obtained by mixing and combining virtual objects with the real world.

The MR technology is similar to the AR technology in that it shows a real object and a virtual object together. However, the virtual object is used to complement the real object in the AR technology, whereas the virtual object and the real object are equally used in the MR technology.

The XR technology may be applied to a head-mounted display (HMD), a head-up display (HUD), a mobile phone, a tablet PC, a laptop computer, a desktop computer, a TV, and a digital signage, for example, and a device to which the XR technology is applied may be referred to as an XR device.

Hereinafter, various embodiments of the present disclosure will be described with reference to the drawings.

FIG. 1 is a block diagram illustrating a food providing apparatus 100 according to an example embodiment. The food providing apparatus 100 may include a container 110 that contains food to be provided to a user, a first gripper 120 that grips the food in the container 110 and moves the food, a processor 130 that controls an operation of the food providing apparatus 100 by receiving information from various structures included in the food providing apparatus 100 and processing the information, and a weight sensor 140 used to measure a weight of food on the food providing apparatus 100. The food providing apparatus 100 may include at least one container 110. The food providing apparatus 100 may include at least one gripper including the first gripper 120 and thus, it can be understood that at least one gripper including the first gripper 120 is used to provide food to a user instead of a single gripper corresponding to the first gripper 120. The weight sensor 140 may transfer weight information for calculating a total weight of the food on the food providing apparatus 100 to the processor 130. For example, a single weight sensor 140 may be provided in the food providing apparatus 100 to transfer the weight information of the total weight of the food on the food providing apparatus 100 to the processor 130. The weight sensor 140 may measure the total weight of the food on the food providing apparatus 100 including the container 110. In this case, the weight sensor 140 may transfer, to the processor 130, weight information obtained by measuring a total weight of food including food on the container 110 and food dropped to an outside of the container 110 in the food providing apparatus 100. A function to be implemented by the food providing apparatus 100 as shown in FIG. 1 will be described in detail with reference to various example embodiments below.

Figure 2:
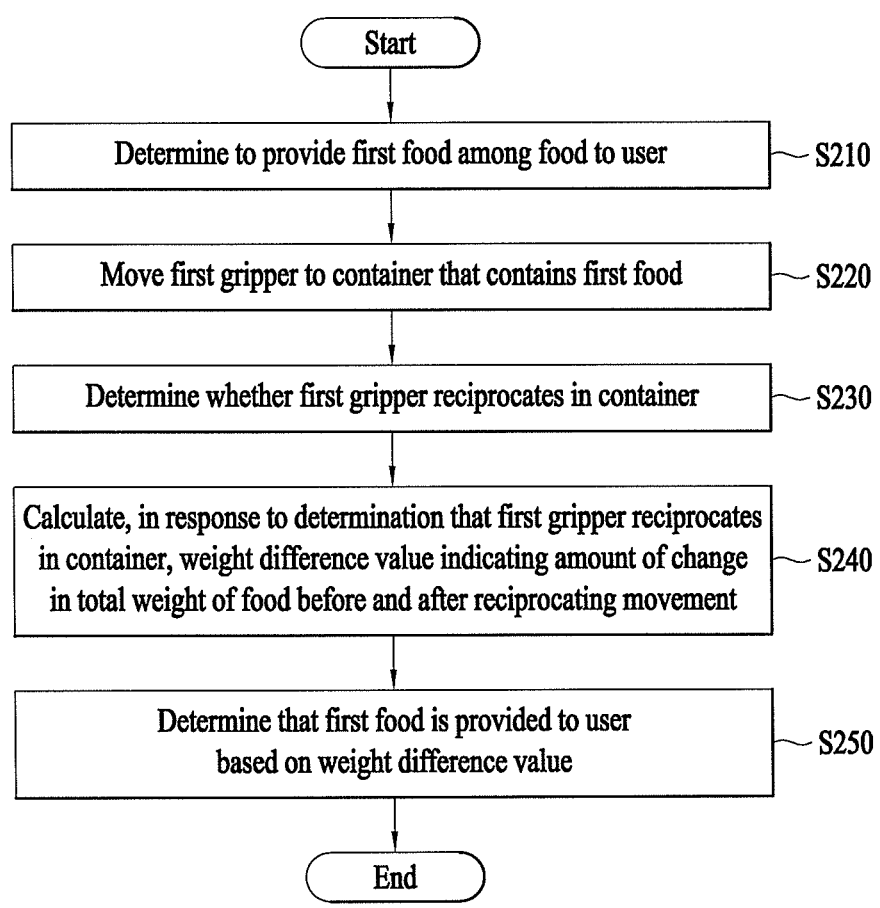
FIG. 2 is a flowchart illustrating a food providing method according to an example embodiment.

FIG. 2 is a flowchart illustrating a food providing method to be implemented by the food providing apparatus 100 according to an example embodiment.

In operation S210, the food providing apparatus 100 may determine to provide first food among food to a user. The food providing apparatus 100 may determine a container 110 including the first food to be provided to the user, based on a predetermined reference. For example, the processor 130 may determine to provide food in predetermined containers including the container 110 in the food providing apparatus 100 to the user in a preset order. Also, the processor 130 may determine food to be provided to the user based on food information recognized through an image capturing device (not shown) included in the food providing apparatus 100. However, the aforementioned examples are merely example embodiments for convenience of description of the operation of the food providing apparatus 100. A method by which the food providing apparatus 100 determines to provide food to a user may employ various techniques for selecting predetermined food to be provided to a user as a technique that is readily available to those skilled in the art.

In operation S220, the food providing apparatus 100 may move the first gripper 120 to the container 110 that contains the first food. The processor 130 of the food providing apparatus 100 may control the first gripper 120 to move to the container 110 that contains the first food determined to be provided in operation S210. Through operation S220, the first gripper 120 may move into the container 110 to grip food.

In operation S230, the food providing apparatus 100 may determine whether the first gripper 120 reciprocates in the container 110. The processor 130 of the food providing apparatus 100 may determine whether the first gripper 120 moves into the container 110 (for example, toward a lower end portion of the container 110), and then moves to an outside (for example, toward an upper end portion of the container 110).

The food providing apparatus 100 may use a predetermined sensor to determine whether such reciprocating movement of the first gripper 120 is performed. Various sensors, for example, an infrared (IR) sensor, a near field communication (NFC) sensor, and an optical sensor may be used to sense the first gripper 120 in the food providing apparatus 100. The processor 130 may use sensing information acquired from the sensor to sense the reciprocating movement of the first gripper 120 moving into the container 110. In an example, the sensor may be installed in association with each of at least one container 110 included in the food providing apparatus 100. For example, the sensor may be installed at an inner side wall of each container 110.

In another example, the sensor may not be installed in association with each of at least one container 110. Instead, the sensor may be installed in various ways to sense whether the first gripper 120 reciprocates in the container 110. For example, the food providing apparatus 100 may determine a container into which the first gripper 120 reciprocates among a plurality of containers 110 based on a distance from the first gripper 120 sensed by a single sensor.

Hereinafter, for brevity, the description will be made based on an example in which the sensor is installed at a side wall of the container 110. A process in which the food providing apparatus 100 senses whether the first gripper 120 reciprocates in the container 110 will be described with reference to FIG. 3.

Figure 3:
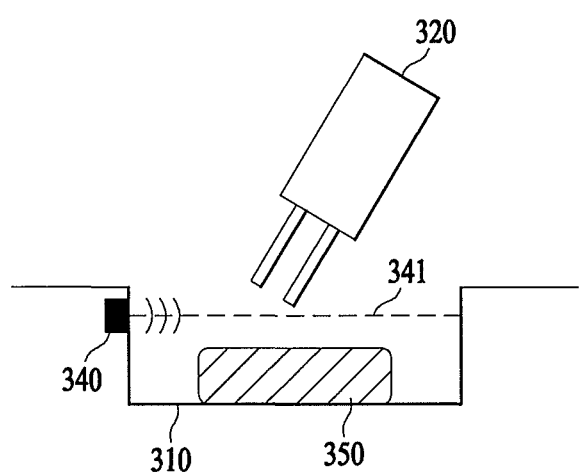
FIG. 3 illustrates a process in which a first gripper moves into a container to grip food in the container according to an example embodiment.

FIG. 3 illustrates a process of moving a first gripper 320 into a container 310 to grip first food 350 in the container 310 according to an example embodiment.

The first gripper 320 may move to the container 310 that contains the first food 350 through operation S220. The food providing apparatus 100 may further include a sensor 340 to determine whether the first gripper 320 reciprocates in the container 310. At least one sensor 340 may be provided to sense whether a reciprocating movement is performed in the container 310. The sensor 340 may be installed on a side wall of the container 310. By using the sensor 340 installed on the side wall of the container 310, the processor 130 may acquire sensing information from the sensor 340 and determine that the first gripper 320 moves into the container 310 when the first gripper 320 moves to a sensing position 341.

When the first gripper 320 is sensed first by the sensor 340 of the container 310 after a determination that the first food 350 in the container 310 is to be provided to a user, the processor 130 may determine that the first gripper 320 moves into the container 310. When the first gripper 320 is sensed again within a predetermined time after the first sensing or when the first gripper 320 is continuously sensed for a predetermined time, and then is not sensed due to a deviation of the first gripper 320, the processor 130 may determine that the first gripper 320 reciprocates in the container 310 based on sensing information acquired from the sensor 340. A method by which the processor 130 determines whether the reciprocating movement is performed based on the sensing information acquired from the sensor 340 should not be construed as being limited to the above-described embodiment. It should be understood and broadly interpreted that the food providing apparatus 100 analyzes the sensing information obtained by sensing the first gripper 320 and determines whether the reciprocating movement is performed in various ways.

When it is determined that the first gripper 120 reciprocates in the container 110 through operation S230, the food providing apparatus 100 may calculate a weight difference value indicating an amount of change in a total weight of food before and after the reciprocating movement in operation S240. After a determination that the first gripper 120 reciprocates in the container 110, the processor 130 may calculate the weight difference value obtained before and after the reciprocating based on weight information acquired by the weight sensor 140 and used the weight difference value to determine whether the first food 350 is provided to a user by the first gripper 120.

In operation S250, the food providing apparatus 100 may determine that the first food is provided to the user based on the weight difference value calculated in operation S240.

Figure 4:
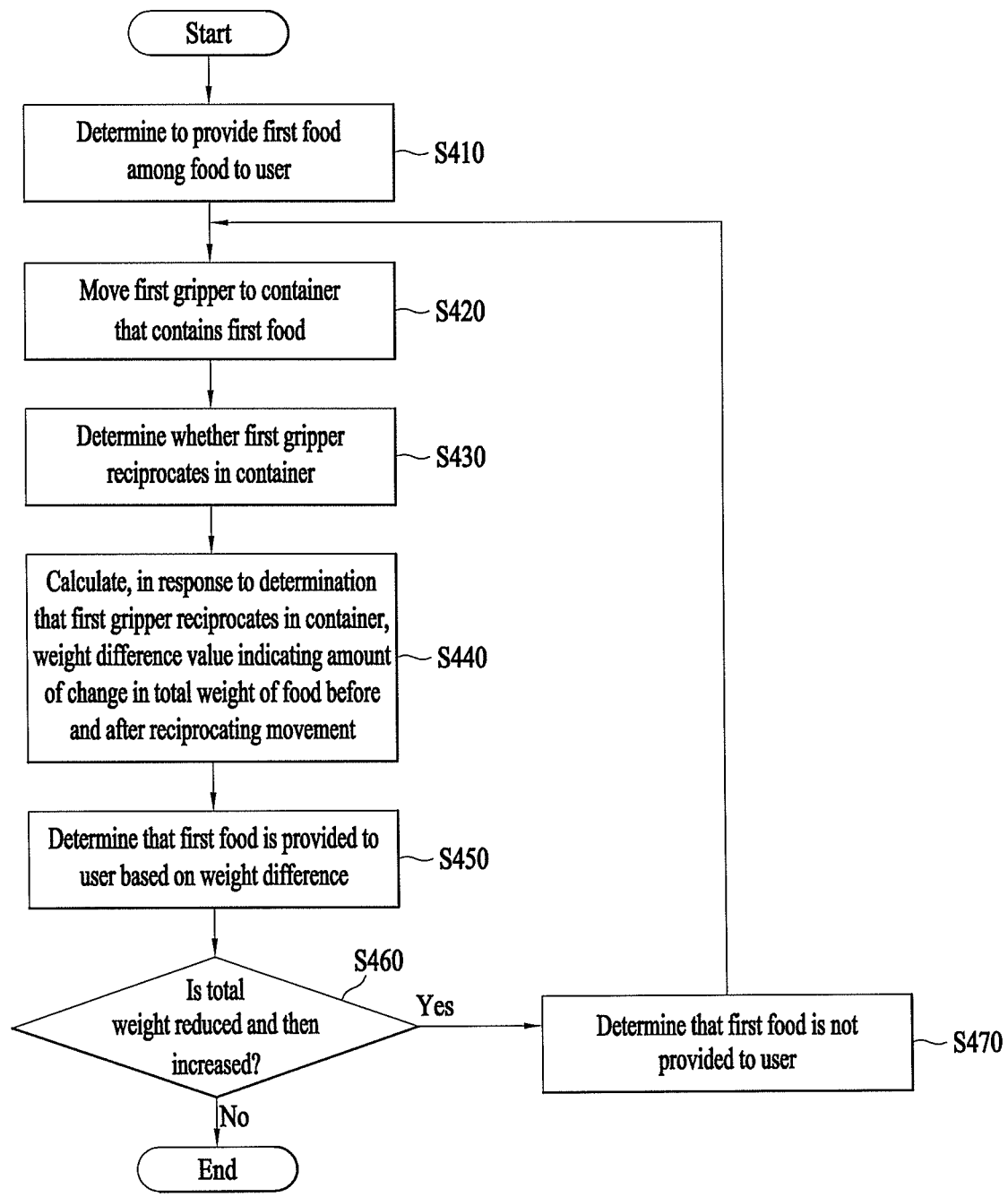
FIG. 4 is a flowchart illustrating a food providing method performed when food is not provided to a user according to an example embodiment.

FIG. 4 is a flowchart illustrating a food providing method performed when food is not provided to a user according to an example embodiment. Since the features of operations S410 through S450 of FIG. 4 are similar or identical to the features of operations S210 through S250 of FIG. 2, repeated description will be omitted.

Based on the weight difference value calculated in operation S440, the food providing apparatus 100 may determine that the first food is provided to the user in operation S450. Thereafter, the food providing apparatus 100 may determine whether a total weight is reduced and then increased in operation S460. The food providing apparatus 100 may measure a weight using the weight sensor 140 before and after the first gripper 120 grips the food in operations S430 and S440 and calculate a weight difference value based on the measured weight. Although the total weight of the food is reduced in response to the first gripper 120 gripping the food in operations S430 and S440, the total weight may be increased when the first gripper 120 drops the food while moving. An amount of food increased again may depend on how much food has been dropped.

When the processor 130 of the food providing apparatus 100 determines that the total weight is reduced and then increased based on weight information acquired from the weight sensor 140 in operation S460, the processor 130 may determine that the first food is not provided to the user in operation S470. The processor 130 of the food providing apparatus 100 may return to operation S420 and move the first gripper 120 again to the container 110 that contains the first food. For example, the processor 130 may suspend an operation of moving the first gripper 120 to a mouth of the user at a point in time of determining that the first food is not provided to the user in operation S470 and move the first gripper 120 again to the container 110 that contains the first food, thereby controlling the first gripper 120 to grip the first food again.

When the processor 130 of the food providing apparatus 100 does not determine that the total weight is reduced and then increased based on weight information acquired from the weight sensor 140 in operation S460, the processor 130 may maintain a process of providing the first food to the user.

Figure 5:
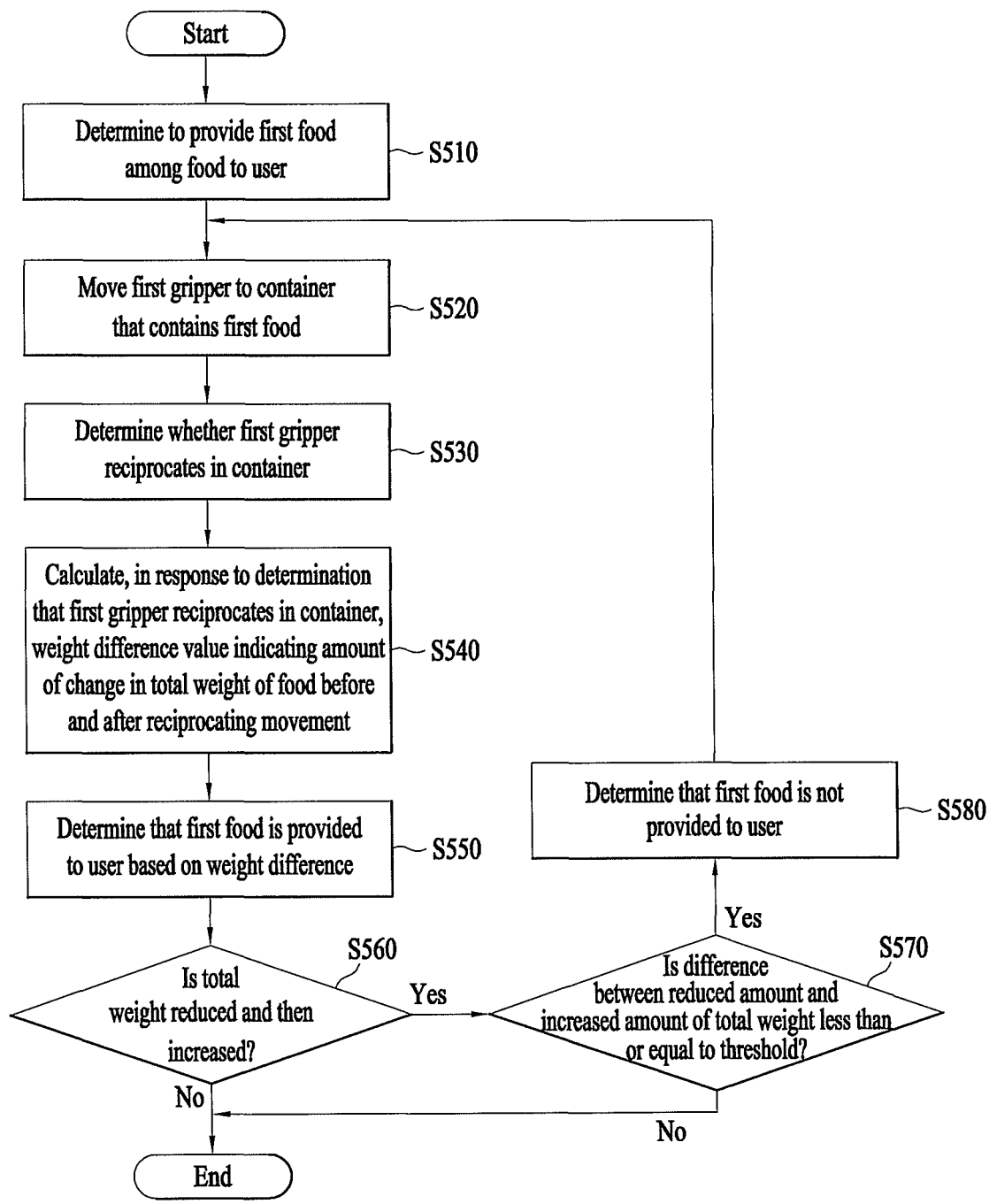
FIG. 5 is a flowchart illustrating a food providing method for providing food to a user by determining whether food is not provided to the user based on an increase and decrease in a total weight of the food according to an example embodiment.

FIG. 5 is a flowchart illustrating a method of providing food to a user by determining whether the food is not provided to the user based on an increase and decrease in a total weight of the food according to an example embodiment. Since the features of operations S510 through S560 of FIG. 5 are similar or identical to the features of operations S410 through S460 of FIG. 4, repeated description will be omitted.

When it is determined that a total weight is reduced and then increased in operation S460, a food providing apparatus 100 may determine whether a difference between a reduced amount and an increased amount of the total weight is less than or equal to a threshold in operation S570. A reduction in total weight may occur in response to the first gripper 120 picking up first food. An increase in total weight may occur when the first gripper 120 picks up the first food and then drops the first food on a food providing apparatus 100. That is, the difference between a reduced amount and an increased amount of the total weight may be a weight corresponding to the first food that remains after the first gripper 120 drops the first food. Also, a food providing apparatus 100 may calculate the difference between the reduced amount and the increased amount of the total weight, thereby determining an amount of the first food being gripped by the first gripper 120. Furthermore, a food providing apparatus 100 may determine whether the difference between the reduced amount and the increased amount of the total weight is less than or equal to a threshold, thereby determining if there is not much first food left in the first gripper 120 after the first gripper 120 drops the first food.

When it is determined that the difference between the reduced amount and the increased amount of the total weight is less than or equal to the threshold in operation S570, the processor 130 of the food providing apparatus 100 may determine that the first food is not provided to the user in operation S580. The processor 130 of the food providing apparatus 100 may return to operation S520 and move the first gripper 120 again to the container 110 that contains the first food. For example, the processor 130 may suspend an operation of moving the first gripper 120 to a mouth of the user at a point in time of determining that the first food is not provided to the user in operation S570 and move the first gripper 120 again to the container 110 that contains the first food, thereby controlling the first gripper 120 to grip the first food again.

Figure 6A:
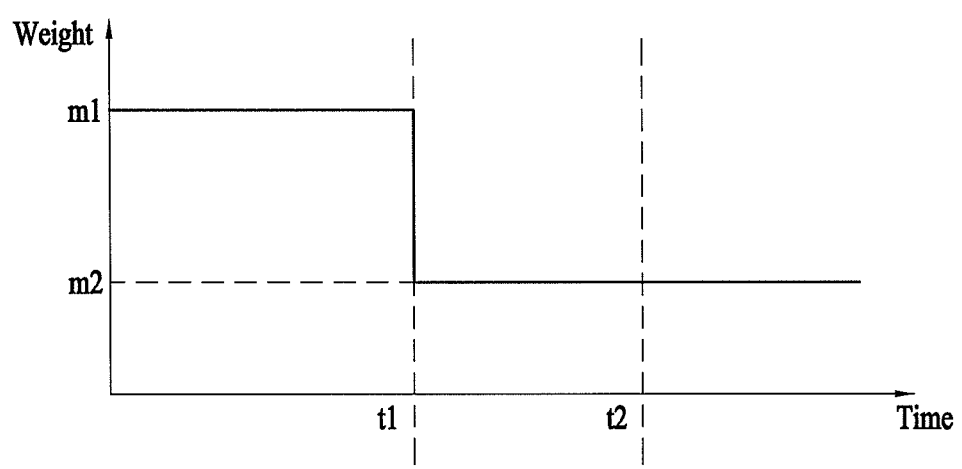
FIGS. 6A through 6C illustrate change conditions of a total weight of food to be considered in a process of performing a food providing method according to an example embodiment.
Figure 6B:
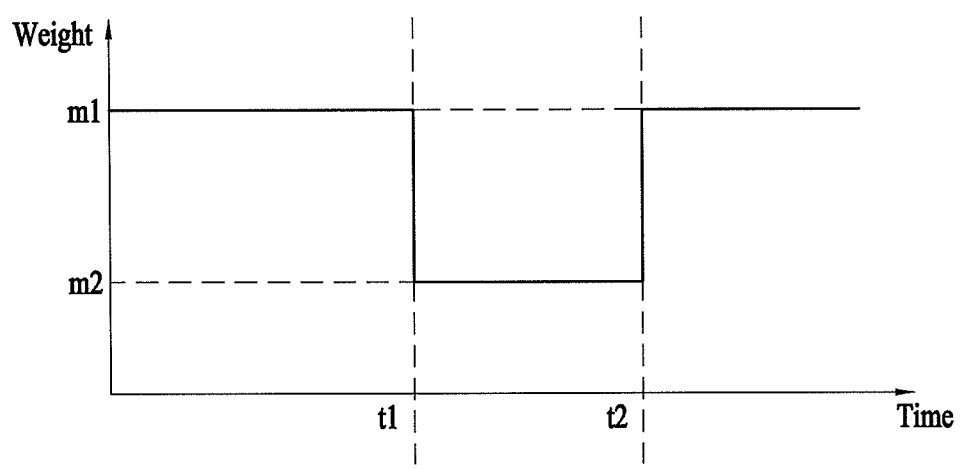
Figure 6C:
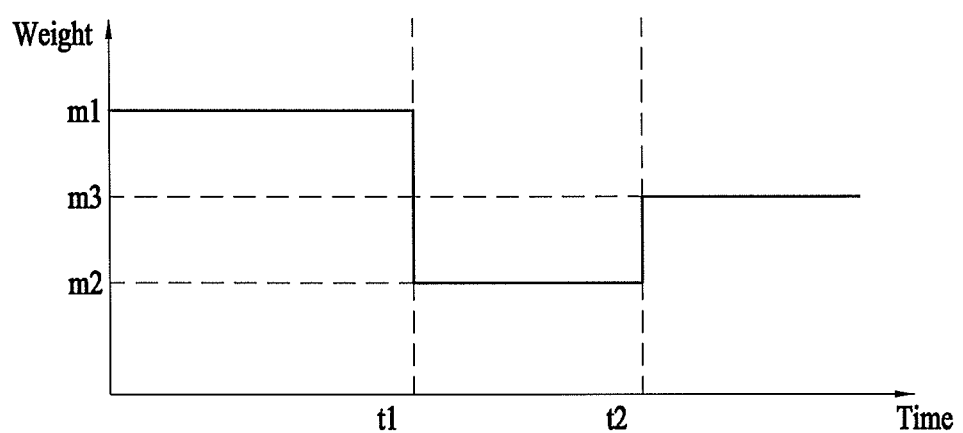

FIGS. 6A through 6C illustrate change conditions of a total weight of food to be considered in a process of performing a food providing method according to an example embodiment.

The food providing apparatus 100 may measure a total weight of food on the food providing apparatus 100 based on weight information acquired through the weight sensor 140. As described herein, when the first gripper 120 of the food providing apparatus 100 drops first food in a process of gripping the first food and providing the first food to the user, the weight information measured in the food providing apparatus 100 may indicate an increase or decrease in the total weight of the food.

Referring to FIG. 6A, m1 denotes a total weight of food measured by the weight sensor 140 of the food providing apparatus 100 before the first gripper 120 grips first food. The total weight of the food may be reduced to m2 at a point in time t1 at which the first gripper 120 grips the first food. That is, the first gripper 120 may grip the first food corresponding to a weight of m1−m2. Thereafter, when the first gripper 120 does not drop the first food, the food providing apparatus 100 may determine that the first food corresponding to an amount of m1−m2 is provided to a user.

Referring to FIG. 6B, the total weight of the food may be reduced from m1 to m2 at the point in time t1 at which the first gripper 120 grips the first food. The first gripper 120 may drop the first food at a point in time t2 in a process of providing the gripped first food to the user. In this example, weight information acquired by the weight sensor 140 of the food providing apparatus 100 may indicate a weight increased to m1 again. The processor 130 may determine that the first gripper 120 drops all the first food gripped at the point in time t1 on the food providing apparatus 100. The processor 130 may suspend an operation of moving the first gripper 120 to a mouth of the user at the point in time t2 and move the first gripper 120 again to the container 110 that contains the first food, thereby controlling the first gripper 120 to grip the first food again.

Referring to FIG. 6C, the total weight of the food may be reduced from m1 to m2 at the point in time t1 at which the first gripper 120 grips the first food. The first gripper 120 may drop the first food at the point in time t2 in a process of providing the gripped first food to the user. In this example, weight information acquired by the weight sensor 140 of the food providing apparatus 100 may indicate a weight increased to m3. The processor 130 may determine that the first gripper 120 drops the first food on the food providing apparatus 100 but does not drop all the first food gripped at the point in time t1.

The processor 130 may compare an increased weight m3−m2 obtained at the point in time t2 in response to the first food being dropped, to a reduced weight m1−m2 obtained at the point in time t1 in response to the first food being gripped. When a difference therebetween is less than a threshold th1, (for example, (m1−m3)<th1), the processor 130 may control the first gripper 120 to pick up the first food again. In this case, the processor 130 may suspend an operation of moving the first gripper 120 to the mouth of the user at the point in time t2 and move the first gripper 120 again to the container 110 that contains the first food, thereby controlling the first gripper 120 to grip the first food again.

The processor 130 may compare the increased weight m3−m2 obtained at the point in time t2 in response to the first food being dropped, to the reduced weight m1−m2 obtained at the point in time t1 in response to the first food being gripped. When a difference therebetween is greater than or equal to the threshold th1, (for example, (m1−m3) ≥th1), the processor 120 may maintain the process of providing the first food to the user instead of suspending the process.

Figure 7:
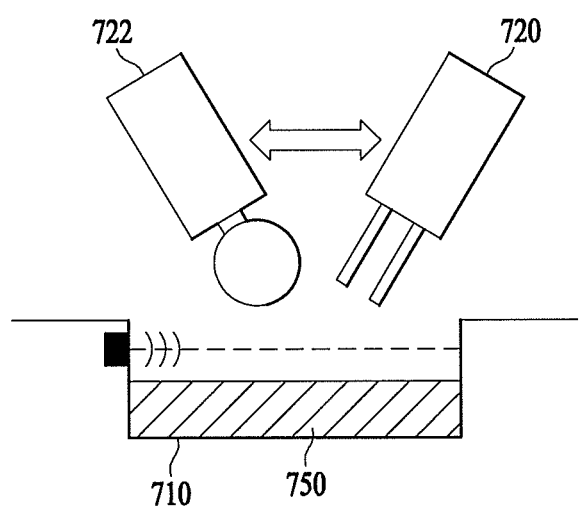
FIG. 7 illustrates a process of changing a first gripper to a second gripper according to an example embodiment.

FIG. 7 illustrates a process of changing a first gripper 720 to a second gripper 722 according to an example embodiment.

The food providing apparatus 100 may include the first gripper 720 and the second gripper 722 and use each of the first gripper 720 and the second gripper 722 to grip first food 750. Since operations of the first gripper 720 and the second gripper 722 moving to a container 710 to grip the first food 750 are similar or identical to the above-described examples, repeated description will be omitted.

The processor 130 may determine one of the first gripper 720 and the second gripper 722 to be used as a gripper for providing food to a user. The processor 130 may control the first gripper 720 or the second gripper 722 to perform a process of changing a currently used gripper to another gripper based on whether a predetermined reference is satisfied. In order to determine whether the first gripper 720 gripping the first food is to be changed to the second gripper 722, the processor 130 may consider a number of times that a determination that the first gripper 720 drops the gripped first good is repeated. For example, the processor 130 may determine that the first gripper 720 is changed to the second gripper 722 based on whether a number of repetitions of a process of moving the first gripper 720 again to the container 710 containing the first food in response to a determination that the first gripper 720 drops the first food while gripping the first food and providing the first food to the user, is greater than or equal to a threshold th2. When the number of repetitions of the process of moving the first gripper 720 again to the container 710 is greater than or equal to the threshold th2, the processor 130 may replace the first gripper 720 with the second gripper 722, thereby controlling an operation of the food providing apparatus 100 so that the first food is picked up.

A process in which the food providing apparatus 100 changes the first gripper 720 and the second gripper 722 may correspond to a process of selecting or changing a gripper to be reciprocated into the container 710 to pick up the first food and thus, should not be construed as being limited to the description above and the form illustrated in FIG. 7. In an example, the food providing apparatus 100 may use both the first gripper 720 and the second gripper 722 to grip the first food.

Figure 8:
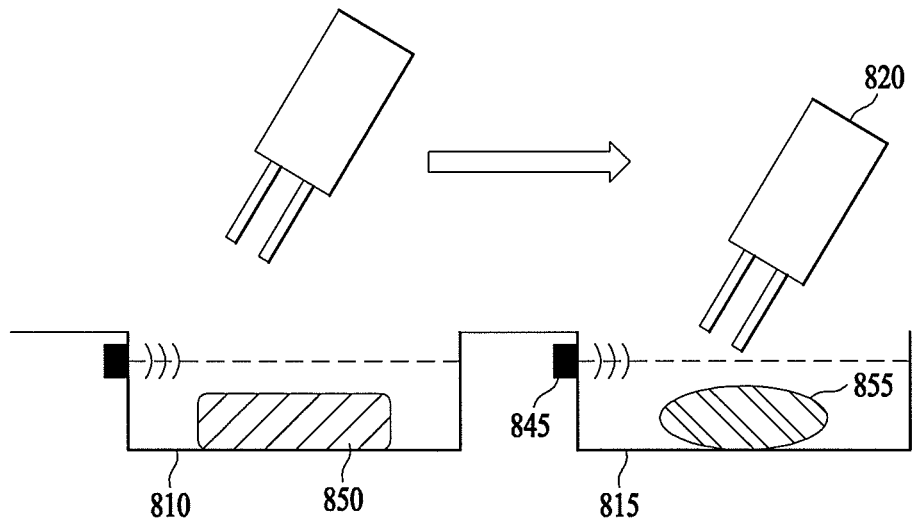
FIG. 8 illustrates a process of moving a first gripper to another container in response to a determination that food is provided to a user according to an example embodiment.

FIG. 8 illustrates a process of moving a first gripper 820 to another container, for example, a second container 815 in response to a determination that food is provided to a user according to an example embodiment.

When it is determined that the first gripper 820 does not drop first food, and then determined that the first food is provided to a user, the processor 130 of the food providing apparatus 100 may control the first gripper 820 to move to the second container 815 in order to provide the user with second food 855 which is different from first food 850 in a first container 810. Like the first container 810, the second container 815 may include a sensor 845. The food providing apparatus 100 may sense a reciprocating movement of the first gripper 820 based on information acquired by the sensor 845 to grip the second food 855 in the second container 815. Since an operation of the food providing apparatus 100 that provides the second food 855 in the second container 815 to the user may correspond to the operation of the food providing apparatus 100 that provides the first food to the user as described above, repeated description will be omitted.

Figure 9:
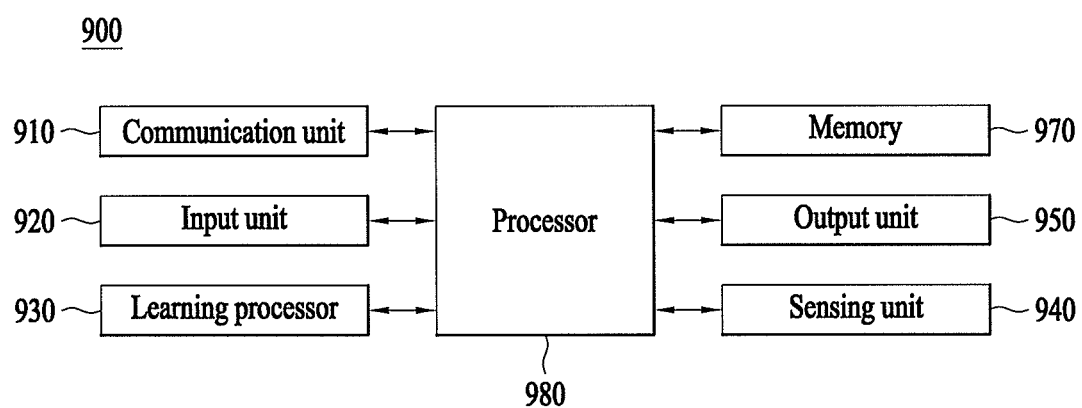
FIG. 9 illustrates an artificial intelligence (AI) device according to an example embodiment.

FIG. 9 illustrates an AI device 900 according to an embodiment of the present disclosure.

AI device 900 of FIG. 9 may correspond to mobile robot 200 of FIG. 2, and some of constituent elements of FIG. 9, which are not included in robot 200 of FIG. 2, may be selectively adopted within a range in which the embodiments of the present disclosure may be realized.

AI device 900 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 9, AI device 900 may include a communication unit 910, an input unit 920, a learning processor 930, a sensing unit 940, an output unit 950, a memory 970, and a processor 980, for example.

Communication unit 910 may transmit and receive data to and from external devices, such as other AI devices 1100a to 1100e and an AI server 1000, using wired/wireless communication technologies. For example, communication unit 910 may transmit and receive sensor information, user input, learning models, and control signals, for example, to and from external devices.

At this time, the communication technology used by communication unit 910 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 920 may acquire various types of data.

At this time, input unit 920 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 920 may acquire, for example, input data to be used when acquiring an output using learning data for model learning and a learning model. Input unit 920 may acquire unprocessed input data, and in this case, processor 980 or learning processor 930 may extract an input feature as pre-processing for the input data.

Learning processor 930 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 930 may perform AI processing along with a learning processor 1040 of AI server 1000.

At this time, learning processor 930 may include a memory integrated or embodied in AI device 900. Alternatively, learning processor 930 may be realized using memory 970, an external memory directly coupled to AI device 900, or a memory held in an external device.

Sensing unit 940 may acquire at least one of internal information of AI device 900, environmental information around AI device 900, and user information using various sensors.

At this time, the sensors included in sensing unit 940 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and a temperature sensor, for example.

Output unit 950 may generate, for example, a visual output, an auditory output, or a tactile output.

At this time, output unit 950 may include, for example, a display that outputs visual information, a speaker that outputs auditory information, and a haptic module that outputs tactile information.

Memory 970 may store data which assists various functions of AI device 900. For example, memory 970 may store input data acquired by input unit 920, learning data, learning models, and learning history, for example.

Processor 980 may determine at least one executable operation of AI device 900 based on information determined or generated using a data analysis algorithm or a machine learning algorithm. Then, processor 980 may control constituent elements of AI device 900 to perform the determined operation.

To this end, processor 980 may request, search, receive, or utilize data of learning processor 930 or memory 970, and may control the constituent elements of AI device 900 so as to execute a predictable operation or an operation that is deemed desirable among the at least one executable operation.

At this time, when connection of an external device is required to perform the determined operation, processor 980 may generate a control signal for controlling the external device and may transmit the generated control signal to the external device.

Processor 980 may acquire intention information with respect to user input and may determine a user request based on the acquired intention information.

At this time, processor 980 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 930, may have learned by learning processor 1040 of AI server 1000, or may have learned by distributed processing of these processors.

Processor 980 may collect history information including, for example, the content of an operation of AI device 900 or feedback of the user with respect to an operation, and may store the collected information in memory 970 or learning processor 930, or may transmit the collected information to an external device such as AI server 1000. The collected history information may be used to update a learning model.

Processor 980 may control at least some of the constituent elements of AI device 900 in order to drive an application program stored in memory 970. Moreover, processor 980 may combine and operate two or more of the constituent elements of AI device 900 for the driving of the application program.

Figure 10:
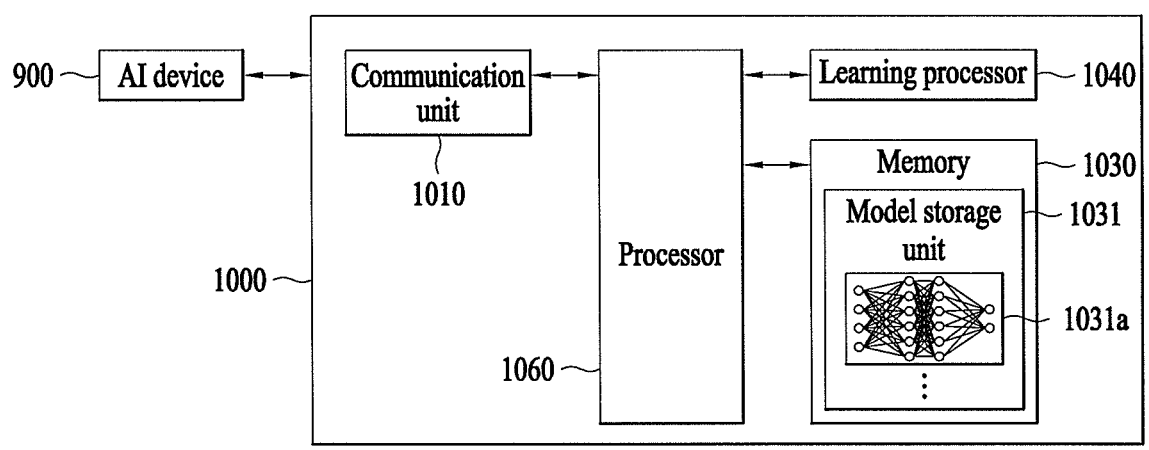
FIG. 10 illustrates an AI server according to an example embodiment.

FIG. 10 illustrates AI server 1000 according to an embodiment of the present disclosure.

Referring to FIG. 10, AI server 1000 may refer to a device that causes an artificial neural network to learn using a machine learning algorithm or uses the learned artificial neural network. Here, AI server 1000 may be constituted of multiple servers to perform distributed processing, and may be defined as a 5G network. At this time, AI server 1000 may be included as a constituent element of AI device 900 so as to perform at least a part of AI processing together with the AI device.

AI server 1000 may include a communication unit 1010, a memory 1030, learning processor 1040, and a processor 1060, for example.

Communication unit 1010 may transmit and receive data to and from an external device such as AI device 900.

Memory 1030 may include a model storage unit 1031. Model storage unit 1031 may store a model (or an artificial neural network) 1031a which is learning or has learned via learning processor 1040.

Learning processor 1040 may cause artificial neural network 1031a to learn learning data. A learning model may be used in the state of being mounted in AI server 1000 of the artificial neural network, or may be used in the state of being mounted in an external device such as AI device 900.

The learning model may be realized in hardware, software, or a combination of hardware and software. In the case in which a part or the entirety of the learning model is realized in software, one or more instructions constituting the learning model may be stored in memory 1030.

Processor 1060 may deduce a result value for newly input data using the learning model, and may generate a response or a control instruction based on the deduced result value.

Figure 11:
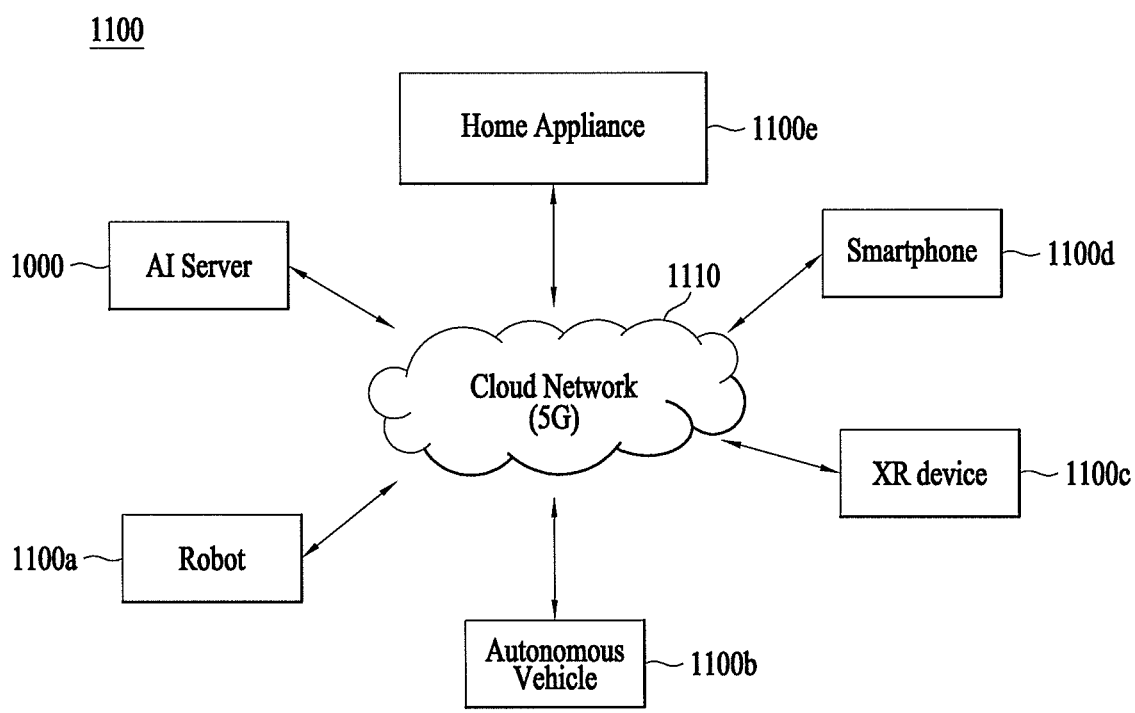
FIG. 11 illustrates an AI system according to an example embodiment.

FIG. 11 illustrates an AI system 1100 according to an embodiment of the present disclosure.

Referring to FIG. 11, in AI system 1100, at least one of AI server 1000, a robot 1100a, an autonomous vehicle 1100b, an XR device 1100c, a smart phone 1100d, and a home appliance 1100e is connected to a cloud network 1110. Here, robot 1100a, autonomous vehicle 1100b, XR device 1100c, smart phone 1100d, and home appliance 1100e, to which AI technologies are applied, may be referred to as AI devices 1100a to 1100e.

Cloud network 1110 may constitute a part of a cloud computing infra-structure, or may refer to a network present in the cloud computing infra-structure. Here, cloud network 1110 may be configured using a 3G network, a 4G or long term evolution (LTE) network, or a 5G network, for example.

That is, respective devices 1100a to 1100e and 1000 constituting AI system 1100 may be connected to each other via cloud network 1110. In particular, respective devices 1100a to 1100e and 1000 may communicate with each other via a base station, or may perform direct communication without the base station.

AI server 1000 may include a server which performs AI processing and a server which performs an operation with respect to big data.

AI server 1000 may be connected to at least one of robot 1100a, autonomous vehicle 1100b, XR device 1100c, smart phone 1100d, and home appliance 1100e, which are AI devices constituting AI system 1100, via cloud network 1110, and may assist at least a part of AI processing of connected AI devices 1100a to 1100e.

At this time, instead of AI devices 1100a to 1100e, AI server 1000 may cause an artificial neural network to learn according to a machine learning algorithm, and may directly store a learning model or may transmit the learning model to AI devices 1100a to 1100e.

At this time, AI server 1000 may receive input data from AI devices 1100a to 1100e, may deduce a result value for the received input data using the learning model, and may generate a response or a control instruction based on the deduced result value to transmit the response or the control instruction to AI devices 1100a to 1100e.

Alternatively, AI devices 1100a to 1100e may directly deduce a result value with respect to input data using the learning model, and may generate a response or a control instruction based on the deduced result value.

Hereinafter, various embodiments of AI devices 1100a to 1100e, to which the above-described technology is applied, will be described. Here, AI devices 1100a to 1100e illustrated in FIG. 11 may be specific embodiments of AI device 900 illustrated in FIG. 9.

Robot 1100a may be realized into a guide robot, a transportation robot, a cleaning robot, a wearable robot, an entertainment robot, a pet robot, or an unmanned flying robot, for example, through the application of AI technologies.

Robot 1100a may include a robot control module for controlling an operation, and the robot control module may refer to a software module or a chip realized in hardware.

Robot 1100a may acquire information on the state of robot 1100a using sensor information acquired from various types of sensors, may detect (recognize) the surrounding environment and an object, may generate map data, may determine a movement route and a driving plan, may determine a response with respect to user intersection, or may determine an operation.

Here, robot 1100a may use sensor information acquired from at least one sensor among a lidar, a radar, and a camera in order to determine a movement route and a driving plan.

Robot 1100a may perform the above-described operations using a learning model configured with at least one artificial neural network. For example, robot 1100a may recognize the surrounding environment and the object using the learning model, and may determine an operation using the recognized surrounding environment information or object information. Here, the learning model may be directly learned in robot 1100a, or may be learned in an external device such as AI server 1000.

At this time, robot 1100a may directly generate a result using the learning model to perform an operation, but may transmit sensor information to an external device such as AI server 1000 and receive a result generated by the external device to perform an operation.

Robot 1100a may determine a movement route and a driving plan using at least one of map data, object information detected from sensor information, and object information acquired from an external device, and a drive unit may be controlled to drive robot 1100a according to the determined movement route and driving plan.

The map data may include object identification information for various objects arranged in a space along which robot 1100a moves. For example, the map data may include object identification information for stationary objects, such as the wall and the door, and movable objects such as a flowerpot and a desk. Then, the object identification information may include names, types, distances, and locations, for example.

In addition, robot 1100a may perform an operation or may drive by controlling the drive unit based on user control or interaction. At this time, robot 1100a may acquire interactional intention information depending on a user operation or voice expression, and may determine a response based on the acquired intention information to perform an operation.

Autonomous vehicle 1100b may be realized into a mobile robot, a vehicle, or an unmanned air vehicle, for example, through the application of AI technologies.

Autonomous vehicle 1100b may include an autonomous driving control module for controlling an autonomous driving function, and the autonomous driving control module may mean a software module or a chip realized in hardware. The autonomous driving control module may be a constituent element included in autonomous vehicle 1100b, but may be a separate hardware element outside autonomous vehicle 1100b so as to be connected thereto.

Autonomous vehicle 1100b may acquire information on the state of autonomous vehicle 1100b using sensor information acquired from various types of sensors, may detect (recognize) the surrounding environment and an object, may generate map data, may determine a movement route and a driving plan, or may determine an operation.

Here, autonomous vehicle 1100b may use sensor information acquired from at least one sensor among a lidar, a radar, and a camera in the same manner as robot 1100a in order to determine a movement route and a driving plan.

In particular, autonomous vehicle 1100b may recognize the environment or an object with respect to an area outside the field of vision or an area located at a predetermined distance or more by receiving sensor information from external devices, or may directly receive recognized information from external devices.

Autonomous vehicle 1100b may perform the above-described operations using a learning model configured with at least one artificial neural network. For example, autonomous vehicle 1100b may recognize the surrounding environment and the object using the learning model, and may determine a driving line using the recognized surrounding environment information or object information. Here, the learning model may be directly learned in autonomous vehicle 1100b, or may be learned in an external device such as AI server 1000.

At this time, autonomous vehicle 1100b may generate a result using the learning model to perform an operation, but may transmit sensor information to an external device such as AI server 1000 and receive a result generated by the external device to perform an operation.

Autonomous vehicle 1100b may determine a movement route and a driving plan using at least one of map data, object information detected from sensor information, and object information acquired from an external device, and a drive unit may be controlled to drive autonomous vehicle 1100b according to the determined movement route and driving plan.

The map data may include object identification information for various objects arranged in a space (e.g., a road) along which autonomous vehicle 1100b drives. For example, the map data may include object identification information for stationary objects, such as streetlights, rocks, and buildings, and movable objects such as vehicles and pedestrians. Then, the object identification information may include names, types, distances, and locations, for example.

In addition, autonomous vehicle 1100b may perform an operation or may drive by controlling the drive unit based on user control or interaction. At this time, autonomous vehicle 1100b may acquire interactional intention information depending on a user operation or voice expression, and may determine a response based on the acquired intention information to perform an operation.

XR device 1100c may be realized into a head-mount display (HMD), a head-up display (HUD) provided in a vehicle, a television, a cellular phone, a smart phone, a computer, a wearable device, a home appliance, a digital signage, a vehicle, a stationary robot, or a mobile robot, for example, through the application of AI technologies.

XR device 1100c may obtain information on the surrounding space or a real object by analyzing three-dimensional point cloud data or image data acquired from various sensors or an external device to generate positional data and attribute data for three-dimensional points, and may output an XR object by rendering the XR object to be output. For example, XR device 1100c may output an XR object including additional information about a recognized object so as to correspond to the recognized object.

XR device 1100c may perform the above-described operations using a learning model configured with at least one artificial neural network. For example, XR device 1100c may recognize a real object from three-dimensional point cloud data or image data using a learning model, and may provide information corresponding to the recognized real object. Here, the learning model may be directly learned in XR device 1100c, or may be learned in an external device such as AI server 1000.

At this time, XR device 1100c may directly generate a result using the learning model to perform an operation, but may transmit sensor information to an external device such as AI server 1000 and receive the generated result to perform an operation.

Robot 1100a may be realized into a guide robot, a transportation robot, a cleaning robot, a wearable robot, an entertainment robot, a pet robot, or an unmanned flying robot, for example, through the application of AI technologies and autonomous driving technologies.

Robot 1100a to which the AI technologies and the autonomous driving technologies are applied may refer to, for example, a robot having an autonomous driving function, or may refer to robot 1100a which interacts with autonomous vehicle 1100b.

Robot 1100a having an autonomous driving function may collectively refer to devices that move by themselves along a given moving line without user control, or move by determining a moving line by themselves.

Robot 1100a and autonomous vehicle 1100b, which have an autonomous driving function, may use a common sensing method in order to determine at least one of a movement route or a driving plan. For example, robot 1100a and autonomous vehicle 1100b, which have an autonomous driving function, may determine at least one of the movement route or the driving plan using information sensed by a lidar, a radar, and a camera.

Robot 1100a, which interacts with autonomous vehicle 1100b, may be provided separately from autonomous vehicle 1100b so as to be connected to the autonomous driving function of autonomous vehicle 1100b inside or outside autonomous vehicle 1100b, or may perform an operation associated with a user who has got on autonomous vehicle 1100b.

At this time, robot 1100a, which interacts with autonomous vehicle 1100b, may acquire sensor information instead of autonomous vehicle 1100b to provide the information to autonomous vehicle 1100b, or may acquire sensor information and generate surrounding environment information or object information to provide the information to autonomous vehicle 1100b, thereby controlling or assisting the autonomous driving function of autonomous vehicle 1100b.

Alternatively, robot 1100a, which interacts with autonomous vehicle 1100b, may monitor the user who has got on autonomous vehicle 1100b or may control the functions of autonomous vehicle 1100b via interaction with the user. For example, when it is determined that a driver is in a drowsy state, robot 1100*a* may activate the autonomous driving function of autonomous vehicle 1100*b* or may assist the control of a drive unit of autonomous vehicle 1100*b*. Here, the functions of autonomous vehicle 1100*b* controlled by robot 1100*a* may include not only the autonomous driving function, but also a function provided in a navigation system or an audio system provided in autonomous vehicle 1100*b*.

Alternatively, robot 1100*a*, which interacts with autonomous vehicle 1100*b*, may provide information to autonomous vehicle 1100*b* or assist the function thereof at the outside of autonomous vehicle 1100*b*. For example, robot 1100*a* may serve as a smart traffic light that provides traffic information including, for example, traffic signal information to autonomous vehicle 1100*b*, or may serve as an automatic electric charger of an electric vehicle that may interact with autonomous vehicle 1100*b* and may be automatically connected to a charge port of the vehicle.

Robot 1100*a* may be realized into a guide robot, a transportation robot, a cleaning robot, a wearable robot, an entertainment robot, a pet robot, an unmanned flying robot, or a drone, for example, through the application of AI technologies and XR technologies.

Robot 1100*a*, to which the XR technologies are applied, may refer to a robot which is a control or interaction target in an XR image. In this case, robot 1100*a* may be provided separately from XR deice 1100*c* and may operate in cooperation with XR device 1100*c*.

When robot 1100*a*, which is a control or interaction target in an XR image, acquires sensor information from sensors including a camera, robot 1100*a* or XR device 1100*c* may generate an XR image based on the sensor information, and XR device 1100*c* may output the generated XR image. Then, such robot 1100*a* may operate based on a control signal input through XR device 1100*c* or via intersection with the user.

For example, the user may check the XR image corresponding to the viewpoint of robot 1100*a*, which is remotely linked, via an external device such as XR device 1100*c*, and may adjust an autonomous driving route of robot 1100*a* or control an operation or driving thereof via interaction with the robot, or may check information on an object around thereof.

Autonomous vehicle 1100*b* may be realized into a mobile robot, a vehicle, or an unmanned air vehicle, for example, through the application of the AI technologies and the XR technologies.

Autonomous vehicle 1100*b*, to which the XR technologies are applied, may refer to an autonomous vehicle having an XR image providing device, or may refer to an autonomous vehicle as a control or interaction target in an XR image, for example. Particularly, autonomous vehicle 1100*b* as a control or interaction target in an XR image may be provided separately from XR device 1100*c* and may operate in cooperation with XR device 1100*c*.

Autonomous vehicle 1100*b* having the XR image providing device may acquire sensor information from sensors including a camera, and may output an XR image generated based on the acquired sensor information. For example, autonomous vehicle 1100*b* may include an HUD to output an XR image, thereby providing an occupant with an XR object corresponding to a real object or an object in the screen.

At this time, when the XR object is output to the HUD, at least a portion of the XR object may be output so as to overlap with a real object to which the passenger's gaze is directed. On the other hand, when the XR object is output to a display provided in autonomous vehicle 1100*b*, at least a portion of the XR object may be output so as to overlap with an object in the screen. For example, autonomous vehicle 1100*b* may output XR objects corresponding to objects such as a lane, another vehicle, a traffic light, a traffic sign, a two-wheeled vehicle, a pedestrian, and a building.

When autonomous vehicle 1100*b* as a control or interaction target in an XR image acquires sensor information from sensors including a camera, autonomous vehicle 1100*b* or XR device 1100*c* may generate an XR image based on the sensor information, and XR device 1100*c* may output the generated XR image. Then, autonomous vehicle 1100*b* may operate based on a control signal input through an external device such as XR device 1100*c* or via interaction with the user.

The above-described method for the entry of a mobile robot to a moving walkway according to the present disclosure may be provided as a program to be executed in a computer and may be recorded on a computer readable recording medium.

The method for the entry of a mobile robot to a moving walkway according to the present disclosure may be executed via software. When executed via software, the constituent elements of the present disclosure are code segments that execute required operations. The program or the code segments may be stored in a processor readable medium.

The computer readable recording medium includes all kinds of recording devices in which data is stored in a computer readable manner. Examples of the computer readable recording device include a ROM, a RAM, a CD-ROM, a DVD-ROM, a DVD-RAM, a magnetic tape, a floppy disc, a hard disc, and an optical data storage device. In addition, the computer readable recording medium may be distributed in a computer device connected thereto via a network so that a computer readable code may be stored and executed in a distribution manner.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of providing food to a user, the method comprising:
   determining to provide first food among the food to the user;
   moving a first gripper to a container that contains the first food;
   determining whether the first gripper reciprocates in the container;
   moving the first gripper toward the user;
   calculating a weight difference value indicating an amount of change in a total weight of the food in the container before and after the reciprocating in response to a determination that the first gripper reciprocates in the container; and
   determining whether the first food is provided to the user based on the weight difference value,
   wherein the determining whether the first food is provided to the user comprises:

determining whether the total weight of the food in the container is reduced and then increased after the determination that the first gripper reciprocates in the container, when it is determined that the total weight of the food in the container is reduced and then increased after the determination that the first gripper reciprocates in the container, determining that the first food is not provided to the user;

in response to the determination that the first food is not provided to the user, suspending moving of the first gripper toward the user, and after suspending moving of the first gripper toward the user, moving the first gripper to the container to grip the first food again.

2. The method of claim 1, wherein the determining that the first food is not provided to the user comprises:

determining that the first food is not provided to the user when a difference between a reduced amount and an increased amount of the total weight of the food is less than or equal to a threshold.

3. The method of claim 1, wherein the determining that the first food is not provided to the user comprises:

moving a second gripper instead of the first gripper when a number of times that the first gripper is moved to the container again is greater than or equal to a predetermined number of times.

4. The method of claim 1, wherein the determining whether the first gripper reciprocates in the container comprises:

recognizing the first gripper using a sensor located in the container to determine whether the first gripper reciprocates in the container.

5. The method of claim 1, wherein the determining whether the first food is provided to the user further comprises:

determining to provide second food different from the first food to the user.

6. A non-transitory computer-readable storage medium storing programs to perform the method of claim 1.

7. The method of claim 1, wherein the determining whether the first gripper reciprocates in the container includes determining whether the first gripper moves into the container and then moves to an outside of the container.

8. The method of claim 1, wherein the determining whether the first gripper reciprocates in the container includes determining whether the first gripper moves toward a lower end portion of the container, and then moves toward an upper end portion of the container.

9. An apparatus for providing food to a user, the apparatus comprising:

at least one container that contains the food;

a first gripper configured to carry the food; and a controller configured to determine to provide first food among the food to the user, control the first gripper to move to a container that contains the first food, determine whether the first gripper reciprocates in the container, control the first gripper to move toward the user, calculate a weight difference value indicating an amount of change in a total weight of the food in the container before and after the reciprocating in response to a determination that the first gripper reciprocates in the container, and determine whether the first food is provided to the user based on the weight difference value, wherein the controller is configured to:

determine whether the total weight of the food in the container is reduced and then increased after the determination that the first gripper reciprocates in the container, when it is determined that the total weight of the food in the container is reduced and then increased after the determination that the first gripper reciprocates in the container, determine that the first food is not provided to the user, in response to the determination that the first food is not provided to the user, control the first gripper to suspend moving of the first gripper toward the user, and after the suspend moving of the first gripper toward the user, control the first gripper to move to the container to grip the first food again.

10. The apparatus of claim 9, wherein the controller is configured to determine that the first food is not provided to the user when a difference between a reduced amount and an increased amount of the total weight of the food is less than or equal to a threshold.

11. The apparatus of claim 9, further comprising:

a second gripper, wherein the controller is further configured to control the second gripper to move to the container instead of the first gripper when a number of times that the first gripper is moved to the container again is greater than or equal to a predetermined number of times.

12. The apparatus of claim 9, wherein the at least one container comprises a sensor, and the controller is configured to recognize the first gripper using the sensor to determine whether the first gripper reciprocates in the container.

13. The apparatus of claim 9, wherein the controller is configured to provide second food different from the first food to the user in response to a determination that the first food is provided to the user.

14. The apparatus of claim 9, comprising:

a sensor to obtain sensing information regarding movement of the first gripper, and the controller is configured to determine whether the first gripper reciprocates in the container based the sensing information obtained by the sensor.

15. The apparatus of claim 14, wherein the controller is configured to determine whether the first gripper reciprocates in the container by determining whether the first gripper moves into the container and then then moves to an outside of the container based on the sensing information obtained by the sensor.

16. The apparatus of claim 14, wherein the controller is configured to determine whether the first gripper reciprocates in the container by determining, based on the sensing information obtained by the sensor, whether the first gripper moves toward a lower end portion of the container, and then moves toward an upper end portion of the container.

* * * * *